July 1, 1924.

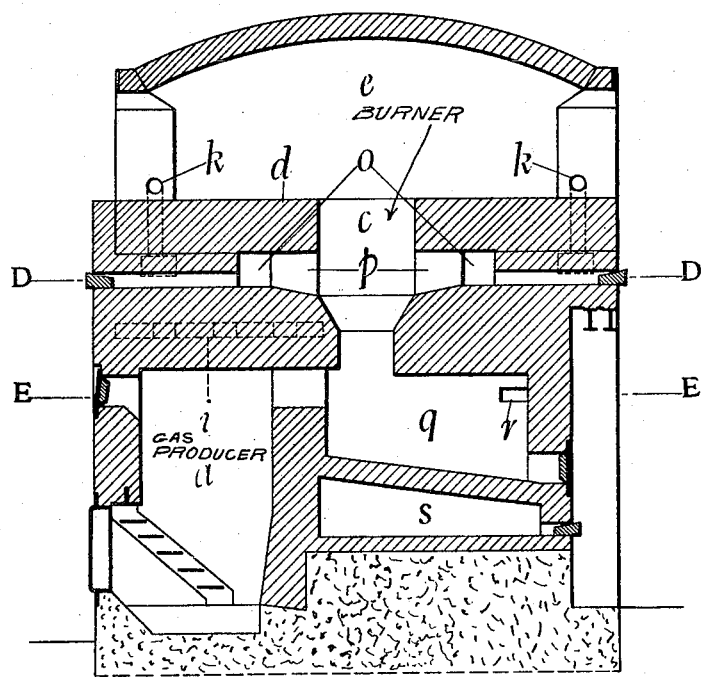
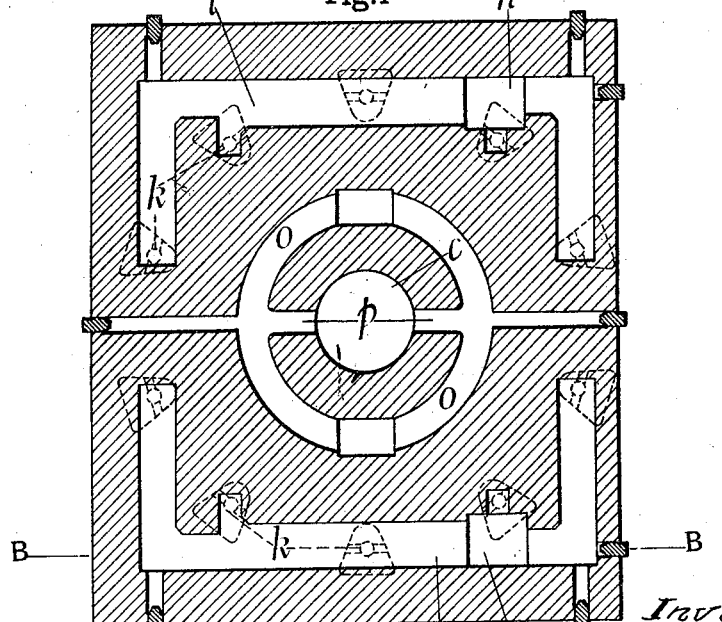

T. TEISEN 1,499,706

CRUCIBLE AND LIKE FURNACE

Filed Dec. 20, 1922

Inventor.
T. Teisen
By Marks Clerk
Att'ys

July 1, 1924.
T. TEISEN
CRUCIBLE AND LIKE FURNACE
Filed Dec. 20, 1922
1,499,706
6 Sheets-Sheet 4
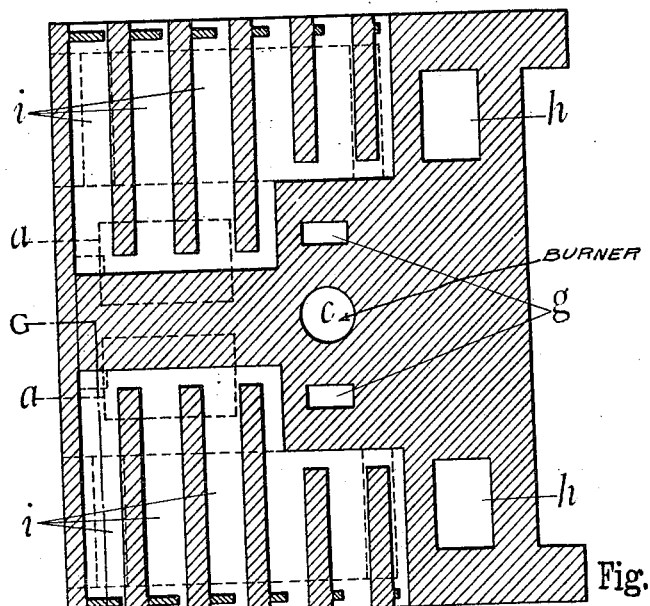
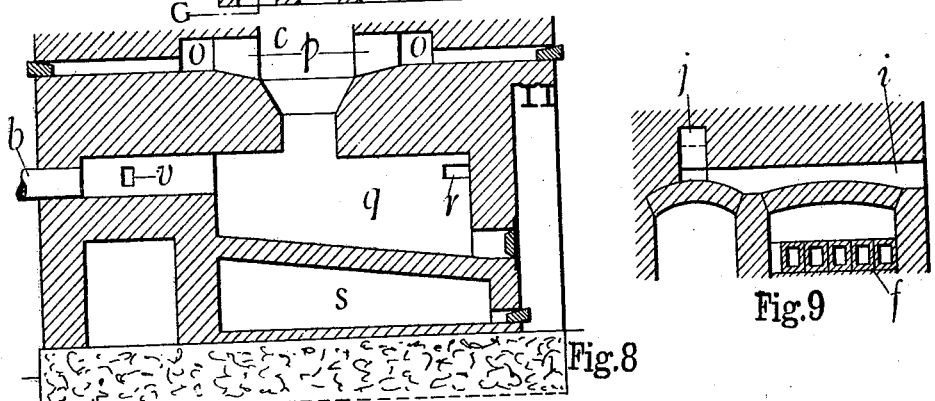

July 1, 1924.

T. TEISEN 1,499,706

CRUCIBLE AND LIKE FURNACE

Filed Dec. 20, 1922

Inventor:
T. Teisen

July 1, 1924.　　　　　　　　　　　　　　　　1,499,706
T. TEISEN
CRUCIBLE AND LIKE FURNACE
Filed Dec. 20, 1922　　　6 Sheets-Sheet 6

Inventor:
T. Teisen

Patented July 1, 1924.

1,499,706

UNITED STATES PATENT OFFICE.

THEODOR TEISEN, OF BIRMINGHAM, ENGLAND.

CRUCIBLE AND LIKE FURNACE.

Application filed December 20, 1922. Serial No. 608,083.

*To all whom it may concern:*

Be it known that I, THEODOR TEISEN, a subject of the King of Denmark, residing at "Ewell," 52 Grove Avenue, Moseley, in the city of Birmingham, England, have invented certain new and useful Improvements Relating to Crucible and like Furnaces, of which the following is a specification.

This invention relates to furnaces for the melting of glass, metal, alloy and other materials, of the kind in which the base contains the heating means, as well as the regenerators or recuperators which serve to heat the air for combustion, while the top contains the crucibles, pots or baths in which the material is melted, such furnaces being heated by one or more burners arranged vertically.

It is well known that molten materials such as glasses, metals, slags from metals and enamels will penetrate solid firebrick walls when the same are sufficiently hot.

The object of the invention is to provide an improved construction whereby any flow of molten material from a leakage in the crucibles, pots or baths, shall not penetrate into and damage any vulnerable parts below, especially the regenerators or recuperators.

The invention also has for its object certain improvements relating to the waste pockets and burner arrangements as hereinafter described.

The invention comprises the provision of a system of horizontal cooling channels through which cold air passes over the recuperators, the channels being arranged to isolate the recuperators completely from any flow of molten material which may come from above. These cooling channels may have inlet and outlet passages arranged at different levels so as to produce a natural draught. The amount of air in each can be regulated by grading the area as required.

Further, the invention comprises the arrangement of hot trap pockets or flues at the side of the recuperators between these and the burner and the waste pocket below same for preventing any molten material reaching the recuperators through the intermediate brickwork. For this purpose the flues which convey air to the burners are extended downwards to form pockets in which can accumulate any molten material coming from the region of the burner and penetrating the brickwork in the vicinity of the upper part of the secondary air flues. By extending them further towards the bottom of the recuperator and foundation any flow from the burner pocket is also completely stopped. This construction is especially suitable where the height of recuperators is low. With high recuperators however in order not to weaken the construction, and also not to cool the combustion air unduly by the circulation which would take place, the pocket is divided by a relatively thin partition into upper and lower parts, the lower part serving to receive molten material which by negligence may be left in the top part, besides acting as a trap for any sideways flow from the burner pocket. The top pocket may where the design allows have a lower part near the rear end wall situated beyond the end of the recuperator, for the purpose of accumulating the waste at this particular spot. In all cases the pockets are furnished with holes in the end walls with stoppers for inspection and cleaning purposes. The bottom pocket may, according to circumstances, consist either of a single channel which may be suitably strengthened by transverse supporting bricks, or preferably a number of vertical trap channels communicating with the horizontal channel arranged beneath them. The vertical channels extend upwards to a pivot nearer the bottom of the top pocket than the recuperator and they are separated from each other by thin pillars of brickwork which are sufficient to strengthen the walls without being able to allow the molten material to flow. Any molten material penetrating the walls from above or from the side will either be trapped in these channels, and run along same and accumulate at the bottom where it can be taken out through a hole with a stopper, or be stopped in the vicinity of same.

The six accompanying sheets of explanatory drawings illustrate by sectional views a glass or like furnace constructed in accordance with this invention.

Figure 1 is a sectional side elevation on the line A. A.

(Figure 4).

(Figure 5).

Figure 4 is a sectional plan on the line D. D. (Figure 1).

Figure 5 is a sectional plan on the line E. E. (Figure 1).

(Figure 5).

Figure 7 is a sectional plan on the line H. H. (Figure 3).

Figure 8 is a sectional side elevation showing an alternative construction to that shown in Figure 1.

Figure 9 is a sectional end view on the line G. G. (Figure 7).

Figure 10 is a sectional plan showing a construction of the air flue alternative to that shown in Figure 4.

Figure 11 is a sectional side elevation showing a pocket construction alternative to that shown in Figure 6.

Figure 13:
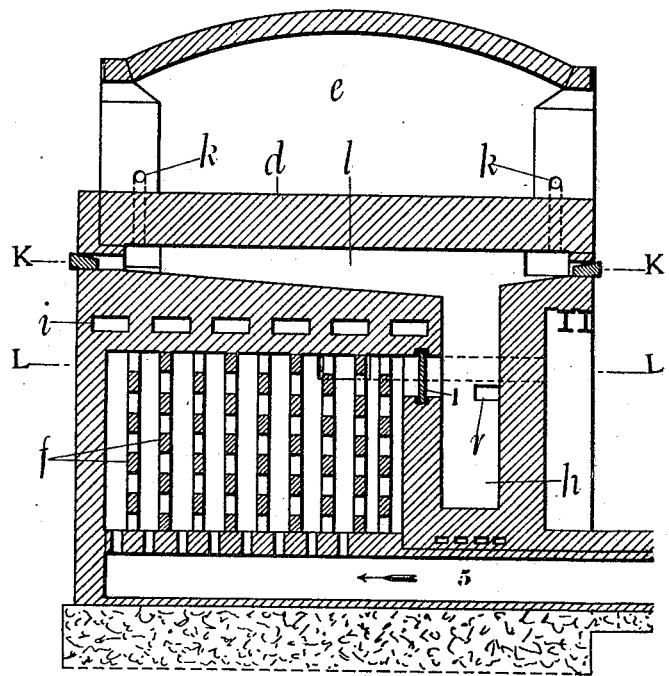

Figure 13 is a sectional side elevation on the line J. J. (Figure 15), and Figures 14 and 15 sectional plans on the lines K. K. L. L. respectively (Figure 13) showing a furnace with a pair of regenerators which are operated alternately.

Figure 2:
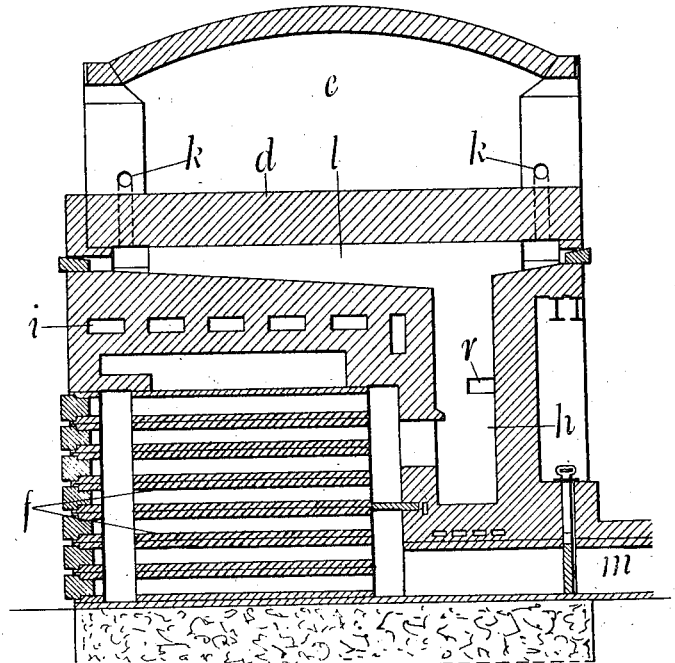
Figure 2 is a sectional side elevation on the line B. B.
Figure 5:
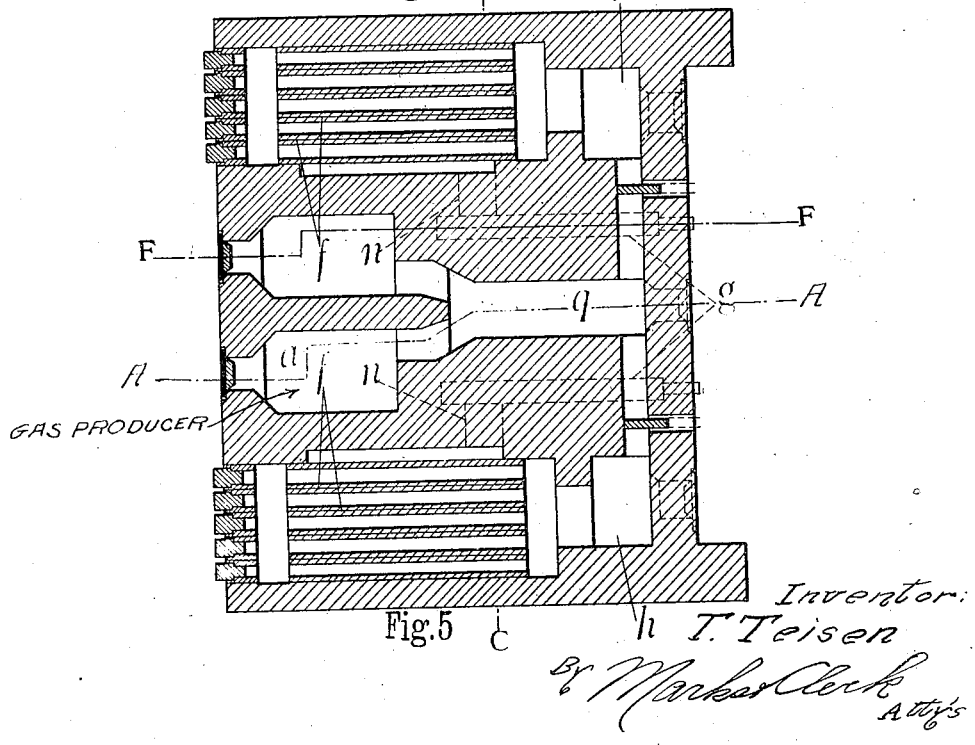
(Figure 5).
Figure 6:
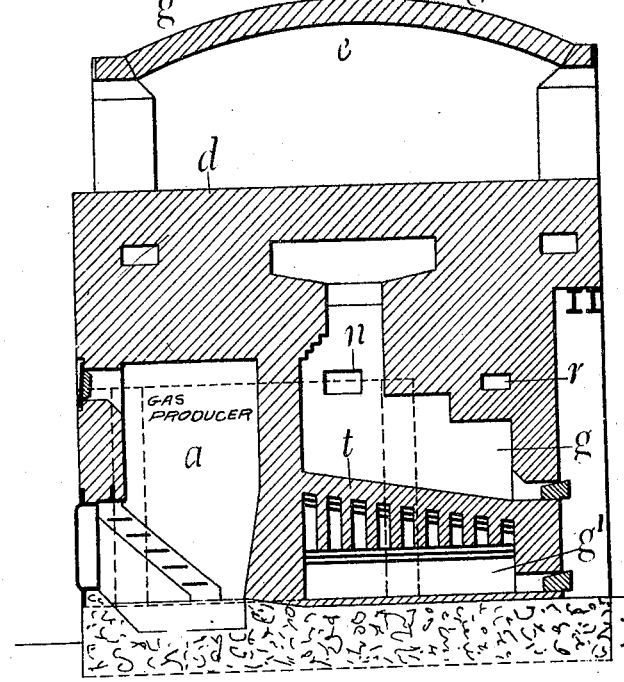
Figure 6 is a sectional side elevation on the line F. F.

A glass or like furnace constructed in accordance with this invention may be fired by gas from two "built-in" gas producers $a$ (Figures 1 and 7) arranged at the centre of the base, or alternatively (as shown in Figure 8) from two gas pipes $b$ connected to an outside producer. The gas is supplied to a vertical burner $c$ arranged centrally in the floor $d$ of the heating chamber $e$. The recuperators $f$ extend to the front and are arranged at the sides of the producers $a$ and the combustion air pockets $g$. At the back where the waste gases enter the recuperators the latter are protected by a glass pit $h$ in a well known manner. A system of horizontal air channels $i$ projecting into the surrounding walls is arranged above the arches, which cover the top of the recuperator and producer. As shown in Figure 9 the inner ends of the channels communicate with short vertical channels $j$ and the latter open into any conveniently arranged outlets which are at a slightly higher level than the inlets to the channels $i$. The disposition of the channels $i$ is clearly shown in Figures 2, 3, 7 and 9. At the side the recuperators are isolated by the air pockets $g$ as well as by the producers. The recuperators are thus completely isolated on all sides. The waste gases are drawn off through passages $k$ communicating with two or more waste gas flues $l$ arranged below the floor level, and each passage communicates with its respective recuperator through which the hot waste gases are passed by an outlet $m$ (Fig. 2) to the chimney. The air entering the same recuperator through channels separated from the waste gas flues, is conducted through channels $n$ (Figure 6) and the pockets $g$ to one or two flues $o$ situated just beneath the bottom of the floor blocks level with the waste gas flues $l$, in order to be as near the floor level as possible. From these flues the air is admitted into the burner $c$ through two or more passages $p$ of which two are arranged opposite each other, extending to the exterior through the solid brickwork between the two sets of waste gas flues, thus enabling this important part of the burner to be inspected and if necessary cleaned, without having to arrange the air flue in a lower level, which would lead to the accumulation of the heat in the burner, instead of in the combustion chamber above. Figure 4 shows a construction in which the flues $o$ are each of semicircular form. In the alternative construction shown in Figure 10 each flue $o$ is in the form of a quadrant.

Beneath the burner is arranged in a well known manner a waste pocket $q$ extended backwards (Figure 1) and fitted with a door. This pocket is made sufficiently large to allow a considerable quantity of the spilt molten material to stand over during melting, and to avoid cooling before removal, a flue $r$ is arranged in each side above the highest metal level through which the hot gases may be by-passed from the producer to one of the waste gas flues before these enter the recuperator. Where the furnace has its own producers built in, the hot gases from them could easily keep the metal pocket hot for any length of time. When cool gas is supplied, a subsidiary air inlet $v$ (Figure 8) may be arranged in the horizontal gas channels for causing premature combustion and raising the temperature in the pocket to the necessary extent.

Figure 3:
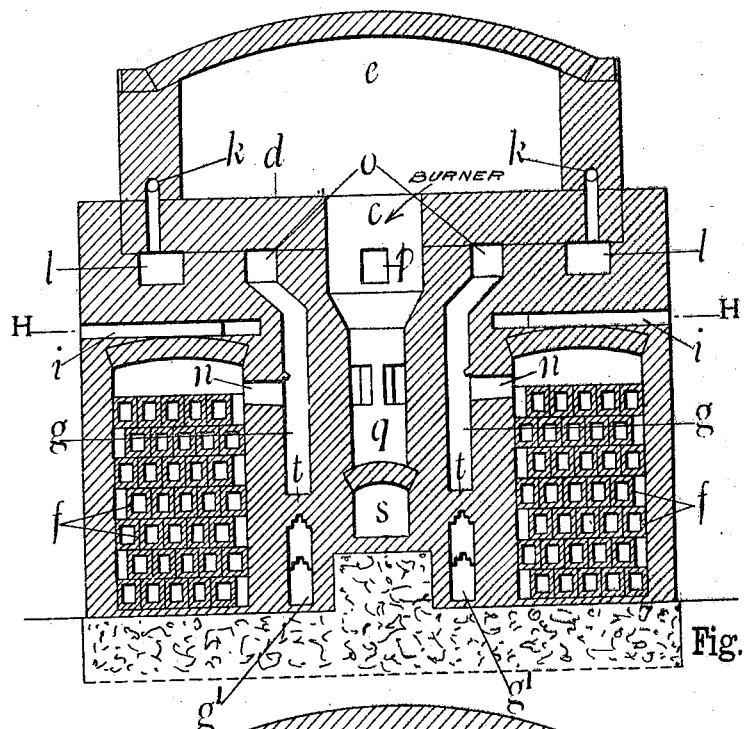
Figure 3 is a sectional end elevation on the line C. C.

The burner pocket above described extends just sufficiently towards the producer to catch the spilt glass, but it might, especially in large furnaces, or furnaces fed from outside, extend as shown in Figure 8 considerably towards the front of the furnace and thereby receive a greater quantity of heat by radiation from above, thus reducing the necessity for additional heating. The bottom of the glass pit or pocket $q$ consists of arches or blocks which are cooled from below preferably by an air space $s$ (Figures 1 and 3). This arrangement ensures that any leakage of glass from the pocket is limited to flow through the side walls of the pocket to places such as the air pockets $g$ where it can readily be trapped. As stated above the said pocket may be divided by a relatively thin partition or wall $t$ into upper and lower parts $q$, $q'$ clearly shown in Figures 6 and 11. An alternative construction of the brickwork in the lower part is shown in Figure 11. Both the forms illustrated are characterized by a number of vertical channels closed at their upper ends by the said part $t$ and opening at their lower ends into a horizontal channel extending to the rear of the furnaces and provided with an inspection opening.

The invention may be applied to furnaces in which the regenerators are intermittently reversed. It may also be applied to furnaces in which a fire box is arranged immediately below the burner, and which therefore have no burner pocket.

Figure 12:
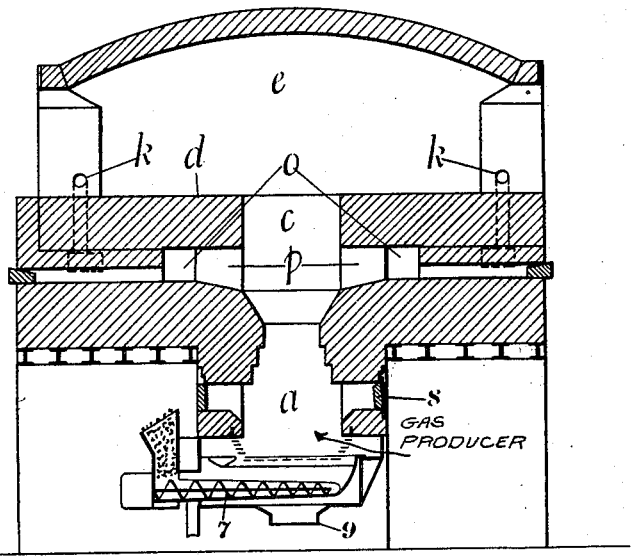
Figure 12 is a section showing a furnace in which the fire box or producer is arranged immediately beneath the burners.

In Figure 12 the furnace $a$ (which may be a solid fuel fire box or a semi-gas producer) is arranged immediately below the burner $c$. The furnace is fed by an underfeed mechanical stoker 7 or another charging device. Also an additional fire door 8 is provided for extra firing. A removable bottom plate 9 serves to catch any molten glass which finds its way through the furnace. By this arrangement the furnace serves also as a glass pocket.

Figure 15:
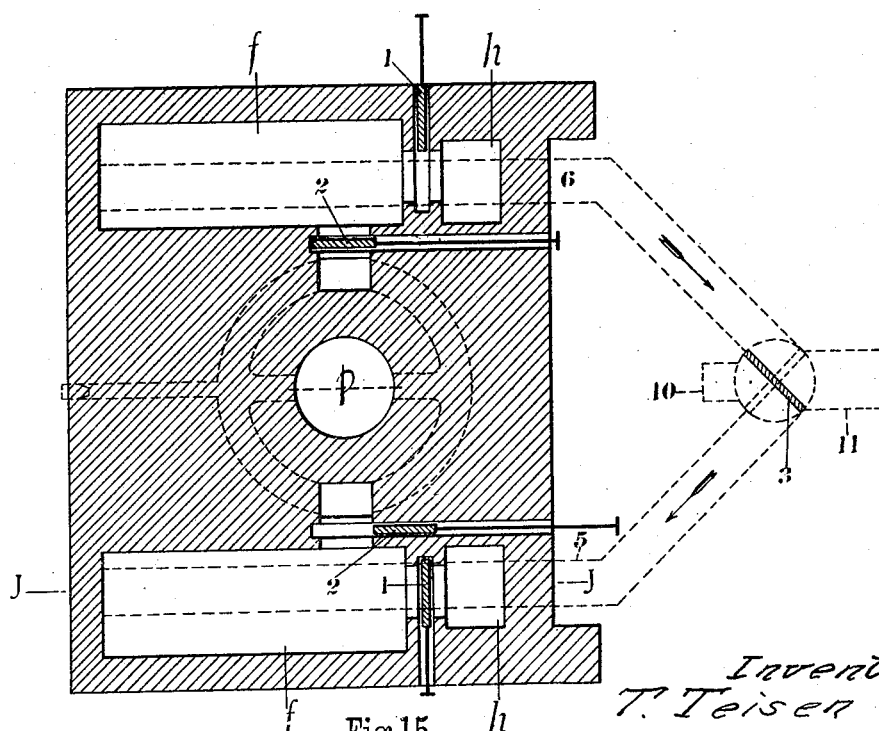
Figure 14:
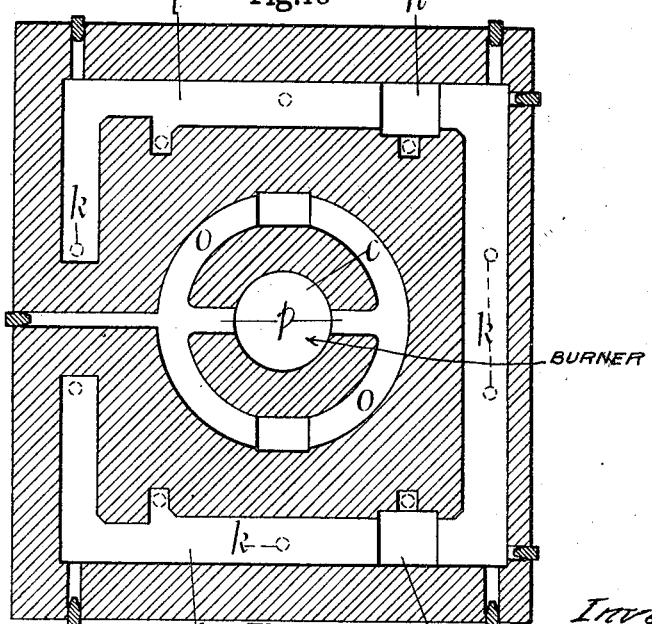

The furnace shown in Figures 13–15 differs from that shown in Figures 1–7 mainly in that the regenerators $f$ operate alternately. While one is being heated by waste gas, the other (previously heated) is being used to heat the air required for combustion. The flues $l$ are connected at one end, and each regenerator is filled with ordinary checker brick work. Branch pipes 5, 6 connected to the regenerators can be put into communication by a reversing valve 3 with an air inlet 10 and waste gas outlet 11. The passages leading to and from the regenerators are controlled by dampers 1, 2. With the valves and dampers in the position shown in Figure 15, air passes by way of the pipe 5 into the underside of one of the regenerators as indicated by the arrow and from thence passes to the gas burner $c$ through the passages $p$. Meanwhile waste gas passes into the other regenerator and out through the lower side of the same into the pipe 6.

The air passes into the furnace and through the recuperators in the manner which is usual in furnaces of this character, and it is believed unnecessary to describe the same further.

Having thus described my invention what I claim as new and desire to secure by Letters Patent is:

1. An improved crucible furnace comprising a heating chamber, a vertical gas burner, a regenerator or recuperator, horizontal air cooling channels arranged over the recuperator between it and the heating chamber, an air pocket situated at the side of the recuperator between it and the burner, and an air outlet communicating between the recuperator and air pocket, substantially as described.

2. In a crucible furnace as claimed in claim 1, horizontal cooling channels provided with inlets and outlets at different levels, substantially as described.

3. In a crucible furnace including the structure claimed in claim 1, an air pocket at the side of the recuperator divided into upper and lower parts by a relatively thin partition, substantially as described.

4. In a crucible furnace as claimed in claim 1, an air pocket at the side of the recuperator divided into upper and lower parts by a relatively thin partition, vertical channels in the lower part, a horizontal channel with which said vertical channels communicate, and means for inspecting the horizontal channel, substantially as described.

5. In a crucible furnace including the structure claimed in claim 1, a pocket beneath the burner, a cooling space beneath the said pocket, and means for heating the pocket, substantially as described.

6. In a crucible furnace as claimed in claim 1, the combination comprising a burner, annular air channels, waste gas passages in the same level as the air channels, and passages communicating with the burner and air channels and extending between the waste gas passages to the exterior of the furnace, substantially as described.

7. In a crucible furnace including the structure claimed in claim 1, the combination with the burner, of a burner pocket extending towards the front of the furnace, substantially as described.

8. In a crucible furnace including the structure claimed in claim 1, and supplied with gas from an external source, the combination with the burner, of a burner pocket, a gas supply channel, and a subsidiary air inlet in the gas channel for effecting partial combustion of gas in the pocket, substantially as described.

9. In a crucible furnace as claimed in claim 1, the combination with the burner, of a furnace arranged beneath the burner, and a removable cover beneath the furnace, substantially as described.

10. In a crucible furnace including the structure claimed in claim 1, the combination with the burner and heating chamber, of a pair of alternately operating regenerators or recuperators, and a reversing valve and dampers for controlling the inflow of air and outflow of waste gases through the opposite regenerators, substantially as described.

In testimony whereof I have signed my name to this specification.

THEODOR TEISEN.